MAGNETIC WAFFLE IRON MEMORY CIRCUITS

Filed July 25, 1963 2 Sheets-Sheet 1

| TIME | PULSE SOURCE | | TIME |
|---|---|---|---|
| | WRITE-READ "1" | WRITE-READ "0" | |
| $t_1$ | 14(−) | | $t_1'$ |
| $t_2$ | 14(+) AND 16(+) | 14(+) | $t_2'$ |
| $t_3$ | 18(−) | 18(−) | $t_3'$ |
| $t_4$ | 18(+) | 18(+) | $t_4'$ |

INVENTOR
A. H. BOBECK
BY William H. Kamstra
ATTORNEY

MAGNETIC WAFFLE IRON MEMORY CIRCUITS

Filed July 25, 1963 2 Sheets-Sheet 2

3,312,960
MAGNETIC WAFFLE IRON MEMORY CIRCUITS

Andrew H. Bobeck, Chatham, N.J., assignor to Bell Telephone Laboratories, Incorporated, New York, N.Y., a corporation of New York Filed July 25, 1963, Ser. No. 297,528
19 Claims. (Cl. 340—174)

This invention relates to magnetic circuits. More particularly, this invention relates to magnetic elements having a plurality of flux paths therein and the magnetic circuitry resulting from various arrangements thereof.

Various hysteretic elements such as the toroidal core and the transfluxor have been found particularly useful in the data processing art. In an effort to reduce fabrication costs of, for example, memory circuitry utilizing such elements and the power requirements therefor, numbers of such elements are duplicated functionally in ferrite sheets in which they are amenable to fabrication and interconnection by mass production techniques.

In the ferrite sheet construction, it is normally necessary to define therein distinct, accessible flux addresses and flux closure paths each of which is capable of assuming two stable magnetic states controllably. One advantageous construction of the ferrite sheet type, however, does not include complete flux closure paths within the ferrite sheet itself. This construction, commonly termed the "waffle iron memory," employs a base plate of relatively low reluctance magnetic material having posts protruding therefrom arranged typically in an array of rows and columns. A continuous sheet of magnetic material having substantially rectangular hysteresis characteristics overlies all the posts and provides in the between-posts portions therein distinct flux addresses for which flux closure paths are available through neighboring posts and the base plate. Such a construction is particularly advantageous because it permits a high-density storage capacity as compared to other ferrite sheet constructions and further permits higher information processing rates.

Hitherto, it has frequently been found difficult to read out nondestructively the information stored in the between-posts portions of the overlay of the waffle iron memory in the absence of a laminate overlay or an arrangement of posts of varying sizes and prescribed spacings as disclosed, for example, in copending applications Serial Nos. 215,318, now Patent No. 3,274,571 and 215,447 of A. H. Bobeck and J. L. Smith, both filed August 7, 1962.

In accordance with this invention, it is an object thereof to provide a new and novel circuit arrangement for interrelating into information storage groups the posts of a waffle iron memory from which groups information can be read nondestructively.

In accordance with this invention, it is another object thereof to provide a variety of related new and novel magnetic circuits from which information can be read nondestructively.

The foregoing and other objects of this invention are realized in one illustrative magnetic memory wherein the plurality of posts therein are separated into information storage groups by a plurality of overlay sections having a prescribed pattern of intersecting legs which provide flux paths between the posts of each group. By means of drive pulses applied to conductors threaded between the posts, the flux in a selected flux path is or is not driven to a remanent flux state in response thereto depending on whether the flux in the intersecting path is in the unblocked or blocked state respectively.

Accordingly, a feature of an embodiment of this invention is an overlay of magnetic material patterned to provide discrete intersecting magnetic legs.

Another feature of the embodiment of this invention is a magnetic element including an overlay of magnetic material patterned to provide a plurality of legs which terminate at different posts protruding from an opposing low reluctance plate and which legs have a single common intersection.

Another feature of this invention is a wiring arrangement for controlling the direction of the magnetic flux in at least a first pair of legs for blocking and unblocking flux switched in another pair of legs which intersect the first pair.

A further feature of this invention is a waffle iron memory including therein a plurality of information storage groups defined by a plurality of overlay sections.

The invention and the objects and features thereof will be understood more fully with reference to the following detailed description of an illustrative embodiment thereof rendered in conjunction with the accompanying drawing wherein:

FIG. 1 depicts an illustrative waffle iron memory exhibiting nondestructive read out in accordance with this invention;

FIGS. 2*a*, 2*b*, 3*a*, and 3*b* depict in its various magnetic states a representative bit address and the associated circuitry thereof from which the illustrative memory of FIG. 1 is built;

It is to be understood that the figures are not necessarily to scale, certain dimensions being exaggerated therein for the purpose of illustration only.

Figures 1, 4:
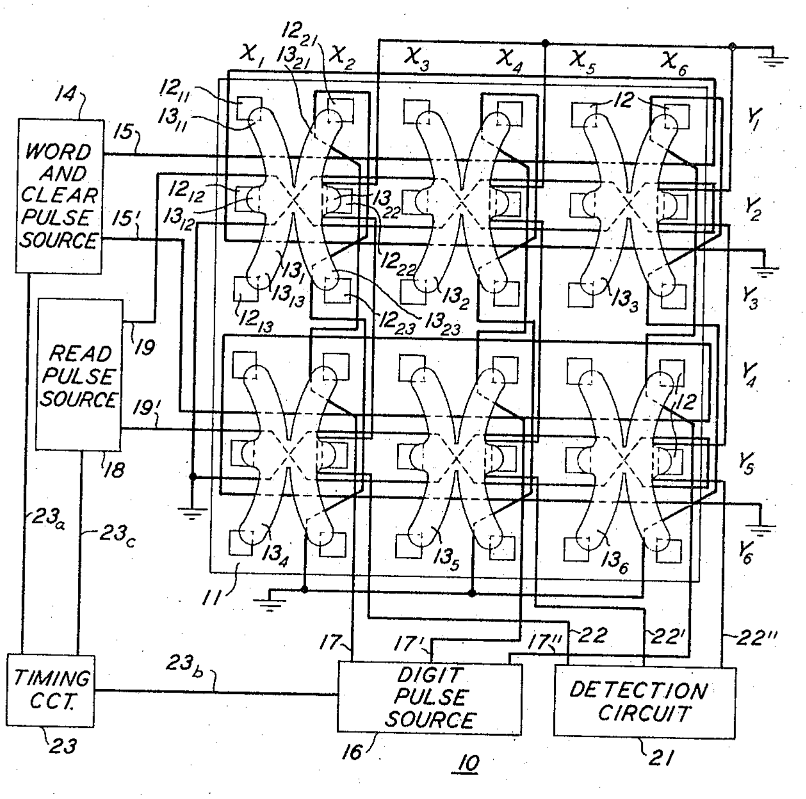
FIG. 4 is a schedule of drive pulse deliveries for the operation of the basic bit address of FIG. 2*a*.

One specific illustrative magnetic memory 10 in accordance with this invention is shown in FIG. 1. The magnetic memory 10 comprises a first magnetic plate 11 of low reluctance, that is, of high magnetic permeability material, having a coordinate array of post $\mathbf{12}_{xy}$ protruding therefrom and forming rows $y_1, y_2 \ldots y_6$ and columns $x_1, x_2 \ldots x_6$. A plurality of second magnetic plates 13 of a magnetic material having substantially rectangular hysteresis characteristics overlie distinct sets of six neighboring posts $\mathbf{12}_{xy}$, each plate 13 defining on the six posts a bit address and imparting to the memory 10 a symmetry in terms of which an explanation and an understanding of the structure and wiring of the memory is facilitated.

Figures 2A, 3A:
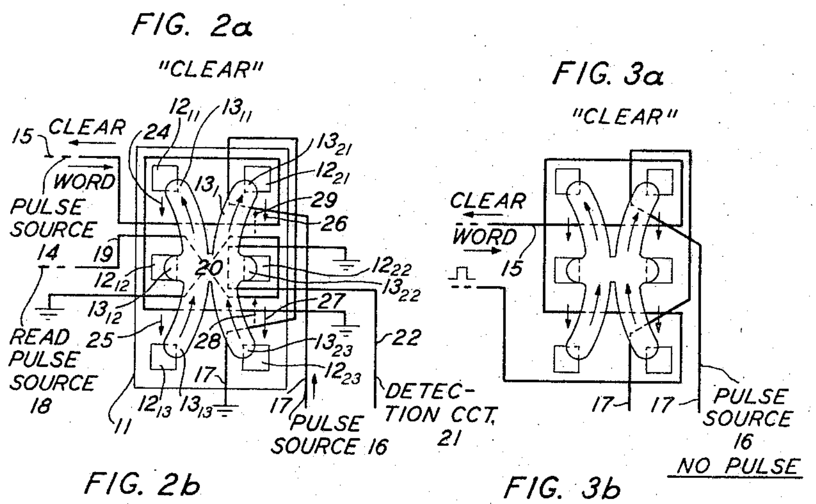

Leaving FIG. 1 for the moment, FIG. 2*a* illustrates in detail one of the aforementioned bit adresses and its associated circuitry. The designations in FIG. 2*a* correspond to those employed in FIG. 1 to emphasize the correspondence between the two figures. Specifically, posts $\mathbf{12}_{11}$, $\mathbf{12}_{12}$, $\mathbf{12}_{13}$, $\mathbf{12}_{21}$, $\mathbf{12}_{22}$ and $\mathbf{12}_{23}$ of FIG. 2*a* cooperate with the plate $\mathbf{13}_1$ of FIG. 1 to define a bit address of memory 10. The plate $\mathbf{13}_1$ is patterned to form six distinct legs $\mathbf{13}_{xy}$ each bearing subscripts corresponding to the underlying post upon which it terminates. Thus leg $\mathbf{13}_{11}$ terminates on post $\mathbf{12}_{11}$, leg $\mathbf{13}_{21}$ terminates on post $\mathbf{12}_{21}$, and so on. In this connection, the term "terminates" does not necessarily mean direct contact with the underlying posts. It is necessary only that the plate 13 provide through its component legs flux closure paths between the various posts on which its legs terminate for reasons which will become clear hereinafter. Legs $\mathbf{13}_{11}$, $\mathbf{13}_{13}$, $\mathbf{13}_{21}$ and $\mathbf{13}_{23}$ are here assumed to have equal minimum cross-sectional areas. The legs $\mathbf{13}_{12}$ and $\mathbf{13}_{22}$ are assumed to have the same minimum cross-sectional areas, which areas are less than that of any of the other four legs as will be explained in detail hereinafter.

A pulse source 14, designated the "word and clear pulse source" and shown in block diagram form in FIG. 1, is coupled to the aforementioned bit address by a conductor 15 which couples the legs $\mathbf{13}_{11}$, $\mathbf{13}_{13}$, $\mathbf{13}_{21}$ and $\mathbf{13}_{23}$ of the plate $\mathbf{13}_1$ in the same sense. That is, as shown in FIG. 2*a*, conductor 15 passes beneath legs $\mathbf{13}_{11}$ and $\mathbf{13}_{21}$, passes above posts $\mathbf{12}_{21}$ and $\mathbf{12}_{11}$ as viewed in the figure, passes beneath legs $\mathbf{13}_{13}$ and $\mathbf{13}_{23}$ and ultimately terminates at ground.

A pulse source 16, designated the "digit pulse source" and shown in block diagram form in FIG. 1, is coupled to the aforementioned bit address by a conductor 17 which, as shown in FIG. 2*a*, couples the legs $\mathbf{13}_{21}$ and $\mathbf{13}_{23}$ in the same sense. That is, conductor 17 passes beneath leg $\mathbf{13}_{21}$, passes above post $\mathbf{12}_{21}$ as viewed in FIG. 2*a* passes to the right of posts $\mathbf{12}_{21}$ and $\mathbf{12}_{22}$, passes beneath leg $\mathbf{13}_{23}$ and ultimately terminates at ground.

A pulse source 18, designated the "read pulse source" and shown in block diagram form in FIG. 1, is coupled the aforementioned bit address by a conductor 19 which, as shown in FIG. 2*a*, passes beneath leg $\mathbf{13}_{11}$, and threads beneath the common intersection 20 of all the legs $\mathbf{13}_{xy}$, appearing again beneath leg $\mathbf{13}_{23}$. Conductor 19 then passes beneath leg $\mathbf{13}_{21}$, again crossing beneath intersection 20, appearing from beneath leg $\mathbf{13}_{13}$, and ultimately terminating at ground.

A detection circuit 21, shown in block diagram form in FIG. 1, as is explained hereinafter, is coupled to the aforementioned bit address by a conductor 22 which, as shown in FIG. 2*a*, passes beneath the leg $\mathbf{13}_{22}$, winds around post $\mathbf{12}_{22}$ and ultimately terminates at ground.

The manner in which the pulse sources 14, 16 and 18 and the detection circuit 21 couple the remaining bit addresses of the memory 10 of FIG. 1 is identical to the above as shown in FIG. 1 and discussed hereinafter.

A timing circuit 23, shown in block diagram form in FIG. 1, is connected to pulse sources 14, 16 and 18, respectively, by means of conductors $\mathbf{23}_a$, $\mathbf{23}_b$ and $\mathbf{23}_c$ also shown in FIG. 1.

The organization and principles of the memory 10 of FIG. 1 will best be understood in terms of an illustrative operation thereof described in connection with FIGS. 2*a*, 2*b*, 3*a* and 3*b*. Preparatory to this discussion, however, it is to be made clear that the memory 10 is word organized, each row of bit adresses thereof comprising a single word. Information is written into and read out of all bit addresses of a word simultaneously by the application of appropriate pulses to conductors coupled to each address of a word as has been described hereinbefore and as is described more fully hereinafter.

The operation of the memory and thus also of the individual bit address thereof includes a clear phase, a write phase, a subsequent read phase and, in the particular embodiment described, a read-reset phase. For simplicity, these phases of operation are described in connection with the writing and reading of both a "1" and a "0" into a bit address, after which the operation is extended to the provision of the word "1", "0", "1" in the bit addresses corresponding to plates $\mathbf{13}_1$, $\mathbf{13}_2$ and $\mathbf{13}_3$ of memory 10. The operational phases are represented as occurring chronologicaly by a time $t$ designation bearing sequential subscripts starting at an arbitrarily selected time $t_1$. Accordingly, at a time designated $t_1$, pulse source 14 is activated under the control of the timing circuit 23 as scheduled in FIG. 4. Source 14 provides in conductor 15 a pulse taken for purposes of illustration to be of a negative polarity indicated by the arrow labeled "clear" as shown in FIG. 2*a*. A pulse of this polarity drives flux in plate $\mathbf{13}_1$ to the "clear" state or, more specifically, drives flux in each leg $\mathbf{13}_{11}$, $\mathbf{13}_{13}$, $\mathbf{13}_{21}$ and $\mathbf{13}_{23}$ upward as viewed in FIG. 2*a*, flux closure paths being provided, for example, for the flux in legs $\mathbf{13}_{11}$ and $\mathbf{13}_{13}$ down through the post $\mathbf{12}_{11}$, across the underlying low reluctance plate 11 and upward through post $\mathbf{12}_{13}$, leaving post $\mathbf{12}_{12}$ substantially magnetically neutral. In this connection, pulse source 14 may be any well known pulse source capable of delivering selectively to conductors 15 and 15' of FIG. 1 pulses suitable for producing the flux changes prescribed in accordance with this invention. In the illustrative embodiment, pulse source 14 provides bipolar pulses as will become apparent immediately hereinafter.

Figures 2B, 3B:
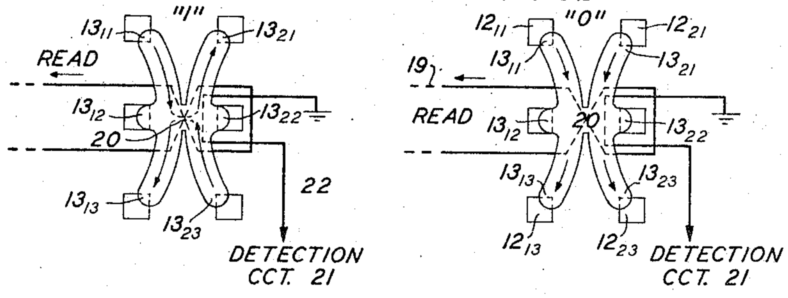

Once the "clear" pattern is established, the following cycle of operation is observed in writing and reading a "1" in the bit address of FIG. 2. Subsequently, at a time designated $t_2$, as scheduled in FIG. 4 under the "write-read" "1" designation, word and clear pulse source 14 and digit pulse source 16 are activated simultaneously under the control of timing circuit 23. At this time, pulse source 14 produces in conductor 15 a pulse of a positive polarity opposite to that produced at time $t_1$ as shown by the arrow labeled "word" in FIG. 2*a*. A pulse of this polarity tends to drive flux in the legs $\mathbf{13}_{11}$, $\mathbf{13}_{13}$, $\mathbf{13}_{21}$ and $\mathbf{13}_{23}$ of plate $\mathbf{13}_1$ into a downward direction as indicated by the arrows 24, 25, 26 and 27 of FIG. 2*a*. Pulse source 16, on the other hand, produces in conductor 17 a pulse of positive polarity coincident with that in conductor 15. In the present embodiment, this pulse in conductor 17 is of lesser amplitude than and substantially equal duration to that in conductor 15, and tends to produce in legs $\mathbf{13}_{23}$ and $\mathbf{13}_{21}$ a flux directed upward as shown by arrows 28 and 29 of FIG. 2*a* for reducing to below the switching threshold the effect in these legs of the pulse in conductor 15. Accordingly, flux in legs $\mathbf{13}_{11}$ and $\mathbf{13}_{13}$ switches downward in response to the pulse in conductor 15. However, no switching occurs in legs $\mathbf{13}_{23}$ and $\mathbf{13}_{21}$ in response to the pulse in conductor 15 because the effect therein of this pulse is essentially nullified by the opposing effect of the pulse in conductor 17 at this same time. As a result of these pulses applied at time $t_2$, the flux in the leg pairs $\mathbf{13}_{11}$ and $\mathbf{13}_{13}$, and $\mathbf{13}_{21}$ and $\mathbf{13}_{23}$ of plate $\mathbf{13}_1$ is directed downward and upward, respectively, as shown in FIG. 2*b*. This flux configuration is taken herein to represent a stored "1" as indicated in the upper portion of FIG. 2*b* and is designated the "unblocked" state for reasons which will become apparent hereinafter. In this connection, pulse source 16 may be any well known unipolar pulse source capable of providing selectively in conductors 17, 17' and 17'' of FIG. 1 pulses of the type required in accordance with this invention. It is noted that pulse source 14 provides herein pulses having amplitudes individually sufficient to produce flux switching in a leg of the overlay coupled thereto.

At a time designated $t_3$, the read pulse source 18 is activated as scheduled in FIG. 4 under the control of timing circuit 23. Thus, there is produced in conductor 19 a pulse of a negative polarity to switch flux in legs $\mathbf{13}_{12}$ and $\mathbf{13}_{22}$ of plate $\mathbf{13}_1$ to the right as viewed in FIG. 2*b*. Because the flux in leg $\mathbf{13}_{11}$ can find closure through leg $\mathbf{13}_{21}$ and because the flux in leg $\mathbf{13}_{23}$ can find closure through leg $\mathbf{13}_{13}$ as indicated by the dashed lines therebetween, intersection 20 is in a demagnetized state, that is to say, in a magnetically unsaturated state, and flux switches there between legs $\mathbf{13}_{12}$ and $\mathbf{13}_{22}$ in response to the pulse in conductor 19 at time $t_3$ thus producing an output pulse in conductor 22 which pulse is detected by detection circuit 21. In this connection, detection circuit 21 may be any well known circuit capable of utilizing a unipolar output pulse of a negative polarity consistent with the switching of flux to the right from leg $\mathbf{13}_{12}$ to leg $\mathbf{13}_{22}$ as viewed in FIG. 2*b*. Also in this connection, read pulse source 18 may be any well known bipolar pulse source capable of providing the flux changes required in accordance with this invention. Since only the read operation is described in connection with FIG. 2*b*, only the elements essential to the description thereof are shown, specifically, the plate 11 and the write conductors 15 and 17 are omitted from that figure. At this juncture in the operation, read out has been achieved without disturbing the flux configuration in legs $13_{11}$, $13_{13}$, $13_{21}$ and $13_{23}$ which represents the information stored in the bit address there. Accordingly, nondestructive read out is realized in accordance with this invention.

Read out, in accordance with this invention, may be provided by switching flux to the right or to the left between legs $13_{12}$ and $13_{22}$ as viewed in FIG. 2*b*. Accordingly, additional read-out operations may be provided as desired by applying alternating positive and negative pulses to conductor 19. However, this would require a detection circuit for utilizing bipolar output pulses resulting therefrom. Detection circuitry for receiving pulses of one polarity may be utilized by providing a resetting pulse following the read-out phase. Accordingly, at a time designated $t_4$, as scheduled in FIG. 4, the read pulse source 18 again is activated under the control of timing circuit 23 for applying to conductor 19 a pulse of a positive polarity opposite to that applied during time $t_3$ for switching the flux in legs $13_{12}$ and $13_{22}$, that is, for reversing the flux in legs $13_{22}$ and $13_{12}$ and in the intersection 20 into a direction toward leg $13_{12}$, readying the circuit for additional read operations if such is desired.

FIG. 3*a* again illustrates the "clear" flux pattern in plate $13_1$ to which pattern each address is returned in accordance with the present embodiment prior to writing information therein. The figure is identical of FIG. 2*a* except for the omission of the plate 11, the read and detection circuitry and the various designations thus providing a clearer illustration of the "clear" pattern. The "clear" pattern, as before, is achieved by the activation of pulse source 14 under the control of timing circuit 23 thus producing a pulse of negative polarity in conductor 15 at time $t'$ resulting in turn in the driving of flux in the legs of plate $13_1$ upward as viewed in the figure. It is to be understood that each $t'$ designation corresponds to the $t$ designation bearing the same subscript, since, in practice, the pulses at the designated times are applied to an entire word at once regardless of its information content. The former designation pertains to a location of a word including a "1"; the latter designation pertains to another location of that word including a "0".

The following cycle of operation then is observed in writing and reading a "0" in the bit address of FIG. 2. The "0" state is designated the "blocked" state. At a time designated $t_2'$ pulse source 14 of FIG. 1 is activated under the control of timing circuit 23 as scheduled in FIG. 4 under the "write-read" "0" designation. As a result of the activation of pulse source 14, a pulse of positive polarity is applied to conductor 15 shown in FIG. 3*a*; thus the flux in plate $13_1$ is driven to the "0" state or, specificaly, the flux in legs $13_{11}$, $13_{21}$, $13_{13}$ and $13_{23}$ is driven downward as viewed in FIG. 3*b*, flux closure being provided in paths into posts $12_{13}$ and $12_{23}$, through the underlying plate 11 and back through posts $12_{11}$ and $12_{21}$, respectively.

At a time designated $t_3'$, read pulse source 18 of FIG. 1 is activated again under the control of timing circuit 23 thus applying to conductor 19, shown in FIG. 3*b*, a negative pulse tending to drive flux in legs $13_{12}$ and $13_{22}$ to the right as viewed in FIG. 3*b*. However, the flux in leg $13_{11}$ can find flux closure only through leg $13_{13}$ and the flux in leg $13_{21}$ can find closure only through leg $13_{23}$ thus magnetically saturating intersection 20 in the flux path transverse to the flux path between leg $13_{12}$ and leg $13_{22}$. Consequently, in order for the pulse in conductor 19 to succeed in driving the flux in legs $13_{12}$ and $13_{22}$ to the right, the pulse would have to be of an amplitude sufficient to drive flux around the longer, that it, the higher reluctance, flux paths including for example leg $13_{21}$, leg $13_{23}$, post $12_{23}$, the corresponding portion of plate 11 and post $12_{21}$. In this connection, read pulse source 18 is limited to producing in conductor 19 pulses of an amplitude insufficient to switch flux around the aforementioned longer paths. Consequently, when a "0" is stored, as represented in FIG. 3*b*, there is no significant output in conductor 22 in response to the pulse in conductor 19.

Thus, detection circuit 21 detects in conductor 22 a pulse in a direction assumed to be negative or, alternatively, the absence of a pulse depending on whether or not flux in legs $13_{12}$ and $13_{22}$ is successfully driven to the right as viewed in FIG. 2*b* in response to the pulse in conductor 19 applied by the read pulse source. The success or failure of the read pulse in this connection is determined by the absence (1) or presence (0) respectively of flux in the path intersecting the path through leg $13_{12}$, the intersection and leg $13_{22}$. Accordingly, a stored 1 and a stored 0 are detected nondestructively.

At a time designated $t_4'$ as scheduled in FIG. 4, read pulse source 18 is activated under the control of timing circuit 23 producing thereby a pulse of positive polarity for driving to the left, as viewed in FIG. 1, the flux in legs $13_{12}$ and $13_{22}$. Since no flux had switched between legs $13_{12}$ and $13_{22}$ in response to the previous pulse, and since there still is flux in the flux path transverse to the path therebetween, there is no flux switching in response to the pulse at this time. In practice, this pulse is applied at this time for read-resetting the entire row of bit addresses for enabling unipolar read out as is described hereinbefore.

The bit address of FIG. 2*a* is repeated six times in the illustrative magnetic memory 10 of FIG. 1 in two rows of three bit addresses each, the individual conductors described in connection with FIG. 2*a* continuing to interconnect serially each additional bit address as shown in FIG. 1 in the described manner before terminating at ground potential as mentioned previously. Of course, this arrangement is merely illustrative and further arrangements of words and numbers of bits are contemplated. Thus the memory 10 includes two words of three bit addresses each. A 1 or a 0 is stored in each bit address of the memory 10 depending on whether or not the digit pulse source produces a pulse coincident with and opposite in polarity to that produced by the word and clear pulse source at time $t_2$. In this connection the synchronization of the various pulse sources and the activation thereof as described hereinbefore are accomplished under the control of a timing circuit 23 shown in block diagram form in FIG. 1. Timing circuit 23 may be any well known timing circuit capable of energizing the pulse sources in a manner suitable in accordance with this invention.

The energization of the conductors 19 or 19' at time $t_3$ produces a pulse therein which tends to switch flux in the cross legs, for example, legs $13_{12}$ and $13_{22}$ of each bit address in a row. The presence or absence of a switching flux in each such address is attended by the presence or absence of a pulse in the associated conductors 22, 22' and 22" thus providing a read out of the entire row of bit addresses (word) simultaneously. For detecting the read out of an entire row, a separate detection circuit may be provided for each bit address in a word. Thus the memory 10 of FIG. 1 may utilize three separate detection circuits, one connected to each of conductors 22, 22' and 22". The detection circuits are well known and understood. Accordingly, they are illustrated as a representative block labeled 21 in FIG. 1. In the read out of a representative word, for example, 1, 0, 1 in the bit addresses corresponding to plates $13_1$, $13_2$ and $13_3$, pulses are induced in conductors 22 and 22" in response to the pulse in conductor 19 during time $t_3$. No pulse is induced in conductor 22' at that time.

It is to be recalled that in the bit address of FIG. 2*a*, the portion of the plate $13_1$ termed the "intersection" and shared by all the legs therein assumes two distinct magnetic conditions controllably. One of these magnetic conditions is illustrated in FIG. 2*b*. Specifically, FIG. 2*b* illustrates all the flux in each of legs $13_{11}$ and $13_{23}$ passing into legs $13_{21}$ and $13_{13}$, respectively, after passing through a portion of the intersection. Consequently, the intersection not only accommodates the flux of both these paths or, in other words, twice the flux accommodated by each of the vertical legs $13_{11}$, $13_{13}$, $13_{21}$, $13_{23}$, but also accommodates the flux switched by the pulse in conductor 19 between cross legs $13_{12}$ and $13_{22}$. In this connection, the term "vertical" is being used to designate all legs directed upward and downward in the plane of the paper and their posts. The term "cross" is being used to designate all legs directed sideways in the plane of the paper and their posts. Since a bit address in accordance with this invention provides an output pulse by the switching of even a small amount of flux between legs $13_{12}$ and $13_{22}$, a limit to the minimum cross-sectional area of the intersection, that is, the cross-section measured vertically, is that it be greater than twice that of the vertical legs and typically equal to or greater than twice the minimum cross-sectional area of a vertical leg plus the minimum cross-sectional area of a cross leg. The minimum cross-sectional area of a cross leg is equal to or less than twice the minimum cross-sectional area of a vertical leg in order to insure the saturation of the cross leg in the blocked state as shown in FIG. 3*b*. In the case where the vertical legs do not have equal minimum cross-sectional areas, the cross-sectional area of the cross leg is normally no greater than twice that of the vertical leg having the smallest minimum cross-sectional area and the minimum cross-sectional area of the intersection is greater than twice that of the vertical leg having the largest minimum cross-sectional area.

In addition, it is necessary in accordance with this invention to insure that flux switched in leg $13_{12}$ find flux closure through leg $13_{22}$ rather than through one of the remaining legs. Accordingly, the length of the (shortest) vertical leg, for example, leg $13_{11}$ of FIG. 2*a*, is longer than that of a cross leg, for example, leg $13_{22}$ of FIG. 2*a* plus the width (that is, the cross dimension) of the intersection, in order for leg $13_{22}$ to provide the lowest reluctance path of the available paths. In this connection, legs $13_{12}$ and $13_{22}$ can be vanishingly small, in which case posts $12_{12}$ and $12_{22}$ may be partially covered by the intersection. In, for example, the six-legged embodiment shown in FIG. 2*a* under the conditions that the cross legs become vanishingly small, the overlay may be modified into an almost rectangular shape as described briefly hereinafter in connection with FIG. 8.

Although the foregoing description of a magnetic memory and the bit address thereof in accordance with this invention is predicated on a magnetic overlay (plate 13) having a prescribed pattern, other overlay patterns would function quite satisfactorily in accordance with this invention as long as there is retained inherent in the structure the capacity to have flux switched in one flux path therein depending on the presence (blocked) or absence (unblocked) of flux in an intersecting flux path, that is to say, more specifically in the intersection therebetween. Accordingly, a bit address in accordance with this invention may comprise an overlay having a pair of intersecting flux paths comprising four or even as few as three legs of magnetic material having an intersection therebetween.

Figures 5, 6:
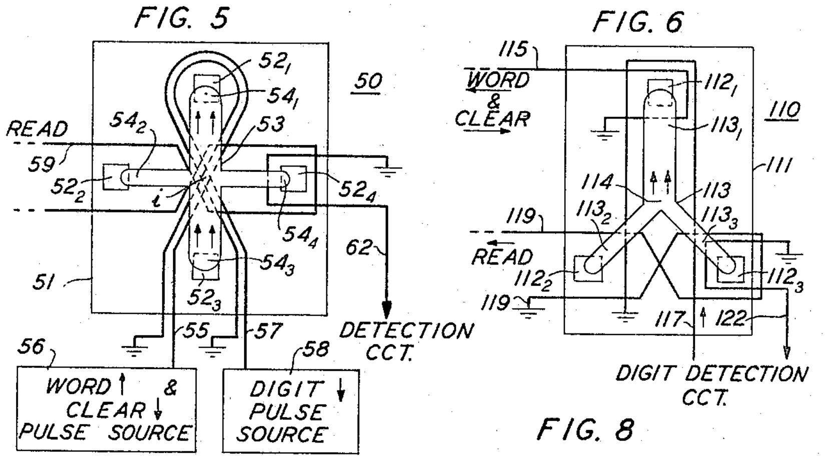
FIGS. 5 and 6 depict additional illustrative bit address arrangements and their associated circuitry in accordance with this invention.

FIG. 5 illustrates a bit address wherein the magnetic overlay is patterned to provide four intersecting legs terminating on four posts. Specifically, the bit address 50 of FIG. 5 comprises a low reluctance base plate 51 having posts $52_1$, $52_2$, $52_3$ and $52_4$ protruding therefrom. Plate 53, of a magnetic material having substantially rectangular hysteresis characteristics and including four legs $54_1$, $54_2$, $54_3$ and $54_4$, overlies base plate 51 such that each of the four legs thereof terminates on the post bearing the same subscript. The four legs of plate 53 meet at a common intersection *i*.

A conductor 55, corresponding to conductor 15 of FIG. 2*a*, couples legs $54_3$ and $54_1$ in a like sense. More specifically, conductor 55 connects, at one end, a pulse source 56 designated the word and digit pulse source, passes beneath leg $54_3$, beneath intersection *i*, around post $52_1$, beneath leg $54_1$, and beneath intersection *i*, emerging from beneath leg $54_3$ and terminating at ground. The conductor 57 also couples legs $54_3$ and $54_1$ in a like sense following the path of conductor 55 in the opposite direction as shown in FIG. 5, connecting pulse source 58 at one end and ground at the other. The conductors 59 and 62 correspond to the conductors 19 and 22 of FIG. 1 following the same path essentially as previously described in connection with FIG. 2*a* and serving the same function. Accordingly, a further description thereof here is deemed unnecessary.

Operation of bit address 50 is essentially the same as that described in connection with FIGS. 2*a*, 2*b*, 3*a* and 3*b*. This becomes particularly apparent if each of legs $54_1$ and $54_3$ of FIG. 5 is taken as corresponding to the leg pairs $13_{11}$ and $13_{21}$ and legs $13_{13}$ and $13_{23}$ of FIG. 2*a* respectively. The structure of the four-legged overlay of FIG. 5 precludes it from providing flux closure paths for flux in the "1" state corresponding to that shown in FIG. 2*b* at leg $13_{21}$ and leg $13_{13}$ for the six-legged overlay. Accordingly, the vertical legs $54_1$ and $54_3$ of FIG. 5 as well as intersection *i* are demagnetized for the "1" condition of the four-legged overlay. The required demagnetized condition is provided by time and/or amplitude limited drive pulses applied to the selected word and digit conductors by any well known pulse sources capable of supplying such pulses. The "0" state is essentialy as shown in FIG. 3*b*, bearing in mind that single vertical legs in the present embodiment correspond to the pairs of vertical legs shown there. In the four-legged overlay of FIG. 5, the aforementioned limitation on the minimum cross-sectional area of the intersection is relaxed because the intersection need not accommodate any flux during the "1" state. The remaining limitations described in connection with the six-legged overlay apply equally as well in the case of the four-legged overlay.

A three-legged overlay in accordance with this invention is shown in FIG. 6. The bit address 110 there shown comprises a base plate 111 of low reluctance material having a plurality of three posts $112_1$, $112_2$ and $112_3$ protruding therefrom. Plate 113, of a magnetic material having substantially rectangular hysteresis characteristics, includes three legs $113_1$, $113_2$ and $113_3$, each terminating on the post having the same subscript. The three legs $113_1$, $113_2$ and $113_3$ have a common intersection 114. In addition, legs $113_2$ and $113_3$ have equal minimum cross-sectional areas assumed approximately equal to one-half that of leg $113_1$. Furthermore, legs $113_2$ and $113_3$ are assumed to be of equal length shorter than leg $113_1$. These limitations are consistent with the considerations for the four-legged overlay noted hereinbefore.

A conductor 115 winds about post $112_1$ and corresponds in function to conductor 15 of FIG. 1. A conductor 117 passing beneath leg $113_3$, above post $112_1$, as viewed in FIG. 6, and beneath leg $113_2$, terminating at ground, corresponds to conductor 17 of FIG. 2*a*. A conductor 122 corresponding to conductor 22 of FIG. 2*a* winds about post $112_3$ and terminates at ground. Again, operation is essentially as described hereinbefore, flux switching in leg $113_3$ in response to the pulse in conductor 119, depending on whether or not the flux in legs $113_1$ and $113_2$ is directed downwardly (blocked) as viewed in FIG. 6, or, alternatively, is in a demagnetized (unblocked) state.

It is evident that various bit addresses in accordance with the invention as shown require various arrangements of prescribed spatial relationships between the underlying posts. Such arrangements are provided in accordance with well known techniques. In the alternative, the shapes shown in FIGS. 5 and 6 may be distorted to fit the posts in the array of rows and columns shown in FIG. 1.

An additional variation is provided in accordance with this invention using the five-legged overlay 130 of FIG.

7 which comprises the top portion of the four-legged overlay of FIG. 5 mated to the bottom portion of the six-legged overlay of FIG. 2*a*. The structure, circuitry and operation of the device resulting from combining the overlay 130 with mating posts is straightforward in light of the foregoing. Consequently, further discussion thereof is deemed unnecessary.

In all the bit addresses where distinct legs are provided in the overlay, the overlay covers the post in an area at least equal to the minimum cross-sectional area of the leg and typically ten times this cross-sectional area in order to ensure a flux closure path of sufficient capacity for the flux switched in the overlay. However, the posts of the waffle iron structure are typically considerably larger than required by the overlay to complete flux closure paths therethrough. Thus, it is evident that greater storage densities in magnetic memories as shown in FIG. 1 utilizing any of the bit address arrangements herein disclosed can be achieved by sharing posts, that is, by having, for example, two distinct overlays covering different portions of one post.

Figure 8:
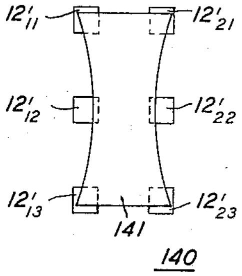
FIGS. 7 and 8 depict still other overlays for additional bit address arrangements illustrating the relationship of underlying posts thereto in accordance with this invention.
Figure 7:
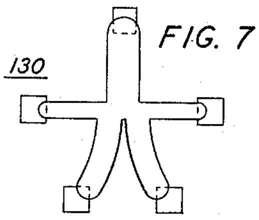

As mentioned hereinbefore, any of the overlays having distinct legs as described may approach, for example, a rectangular shape as depicted in FIG. 8. As the legs decrease in length, the intersection increases to become the bulk portion of the overlay.

In FIG. 8 is shown an illustrative six-post bit address 140 including an overlay 141 having slightly concave sides $S_1$ and $S_2$ which terminate along its periphery on all six posts as shown in FIG. 8, thus providing functional flux legs which correspond to the more discretely defined legs of the overlay of FIG. 2*a*. The module if structurally simple, providing in the overlay between-posts portions for completing flux paths between the posts and, further, is analogous in circuit arrangement and function to the six-legged bit address of FIG. 2*a*. Accordingly, the bit address will not be described here in any great detail. However, in order to ensure in this structure the prescribed flux arrangements required in accordance with this invention as shown in FIGS. 2*a*, 2*b*, 3*a* and 3*b*, limitations are imposed on the extent to which the overlay covers the various posts. More specifically, the overlay of FIG. 8 covers less of cross posts $\mathbf{12}_{12}'$ and $\mathbf{12}_{22}'$ than vertical posts $\mathbf{12}_{11}'$, $\mathbf{12}_{13}'$, $\mathbf{12}_{21}'$ and $\mathbf{12}_{23}'$ in order that the flux leaving posts $\mathbf{12}_{11}'$ and $\mathbf{12}_{21}'$ in the "0" condition shown in FIG. 3*b* is more than enough to saturate the portion of overlay covering the cross posts. This limitation on the coverage of the posts is necessary to avoid switching between posts $\mathbf{12}_{12}'$ and $\mathbf{12}_{22}'$ in response to the pulse from the read pulse source when the bit address is in the "0" condition and is realized, conveniently, by making the sides of the overlay slightly concave. In addition, the distance between the cross posts is shorter than that between a vertical post and a cross post to ensure switching in the preferred path during read out of a "1." Similar considerations dictate the relative coverage of posts in other bit addresses utilizing overlays including functional legs in accordance with this invention. As has been mentioned hereinbefore in connection with bit addresses including overlays having a plurality of legs, sharing of the underlying posts by a plurality of overlays, including the functional legs, is possible also.

No effort has been made to exhaust all possible embodiments of this invention. It will be understood that the embodiments described are merely illustrative of the various forms of this invention and that various modifications may be made therein by one skilled in the art without departing from the scope and spirit of the invention.

What is claimed is:

1. A magnetic memory circuit comprising a first magnetic plate having first, second and third posts protruding therefrom, a second magnetic plate having substantially rectangular hysteresis characteristics overlying said posts, said second magnetic plate being patterned to provide first, second and third intersecting legs between said first, second and third posts, means for driving to unblocked and blocked states the flux in a first and second of said legs, and means for applying a switching pulse to said third leg.

2. A magnetic memory circuit comprising a first magnetic plate having first, second, third and fourth posts protruding therefrom, a second magnetic plate having substantially rectangular hysteresis characteristics overlying said posts, said second magnetic plate being patterned to provide first, second, third and fourth legs between said first, second, third and fourth posts, respectively, said legs having a single common intersection, said first and second of said legs each having a minimum cross-sectional area no greater than twice that of the one of said third and fourth legs having the smallest minimum cross-sectional area, means for driving to unblocked and blocked states the flux in said third and fourth legs, and means for applying a switching pulse to said first and second legs.

3. A magnetic memory circuit in accordance with claim 2 also comprising means for sensing the switching of flux in said first and second legs.

4. A magnetic memory circuit in accordance with claim 2 wherein said first and second legs form a flux path shorter than that formed by said third and fourth legs.

5. A magnetic memory circuit in accordance with claim 2 wherein said intersection has a minimum cross-sectional area greater than twice the area of the one of said third and fourth legs which has the larger minimum cross-sectional area, and the length of each of said third and fourth legs is substantially equal to that of said first leg plus the width of said intersection.

6. A magnetic memory circuit comprising a first magnetic plate having six posts protruding therefrom, a second magnetic plate having substantially rectangular hysteresis characteristics overlying said posts, said second magnetic plate being patterned to provide six intersecting legs between said six posts, means for driving to unblocked and blocked states the flux in four of said six legs, and means for applying a switching pulse to the other two legs.

7. A magnetic memory circuit comprising a first magnetic plate having a plurality of posts protruding therefrom, a second magnetic plate having substantially rectangular hysteresis characteristics overlying said posts for providing therein first and second intersecting between-posts portions between first and second pairs of said plurality of posts, respectively, said second magnetic plate covering less of the area of the posts in said first pair than in said second pair, means for driving to blocked and unblocked states the flux in said second between-posts portion, and means for applying a switching pulse to said first between-posts portion.

8. A magnetic memory arrangement comprising a first magnetic plate having a plurality of posts protruding therefrom, a plurality of second magnetic plates associating predetermined ones of said posts in information storage groups, each second plate having substantially rectangular hysteresis characteristics and being patterned to complete a plurality of legs having an intersection between the posts of said storage group.

9. A magnetic memory arrangement comprising a first magnetic plate having a plurality of posts protruding therefrom, a plurality of second magnetic plates each associating a set of six of said posts in an information storage group, each second plate having substantially rectangular hysteresis characteristics and being patterned to complete six legs having a common intersection between the six posts of its storage group.

10. A magnetic memory arrangement comprising a first magnetic plate having a plurality of posts including first, second and third posts protruding therefrom, a plurality of second magnetic plates associating predetermined ones of said plurality of posts in information storage groups, each second plate having substantially rectangular hysteresis characteristics and being patterned to complete a plurality of legs including first, second and third legs having a single common intersection between said first, second and third posts of each storage group, first and second of said legs each having a minimum cross-sectional area no greater than twice that of said third leg, said first and second legs each having a length less than that of said third leg.

11. A magnetic memory arrangement comprising a first magnetic plate having a plurality of first and second pairs of posts protruding therefrom, a plurality of second magnetic plates having substantially rectangular hysteresis characteristics each associating a first and second pair of said posts in an information storage group, said second magnetic plates providing therein first and second intersecting between-posts portions between said first and second pairs of posts of each storage group, means for driving to unblocked and blocked states the flux in said second between-posts portions, and means for applying a switching pulse to said first between-posts portions.

12. A magnetic memory arrangement comprising a first magnetic plate having a plurality of posts protruding therefrom, a plurality of second magnetic plates associating predetermined ones of said posts in information storage groups, each of said plurality of second plates having substantially rectangular hysteresis characteristics and providing therein first and second intersecting between-posts portions between associated first and second pairs of posts of each information storage group respectively, each of said plurality of second magnetic plates covering less of the area of the posts in the associated first pair of posts than in the associated second pair of posts, means for inducing an unblocked state in said second between-posts portion of selected ones of said information storage groups such that said first between-posts portion in said selected ones of said information storage groups is unblocked to a switching flux, and read-out means for applying a switching pulse to said first between-posts portion in each of said information storage groups.

13. A magnetic memory arrangement comprising a first magnetic plate having a plurality of posts protruding therefrom, a plurality of second magnetic plates associating predetermined ones of said posts in information storage groups, said second plates having substantially rectangular hysteresis characteristics and being patterned to complete between the posts of each storage group a plurality of legs having a common intersection, means for inducing an unblocked state in particular ones of said legs such that a pair of said legs between two of said posts of selected ones of said storage groups is unblocked to a switching flux, and means for applying a switching pulse to said pair of legs.

14. A magnetic memory arrangement comprising a first magnetic plate having a plurality of posts protruding therefrom, a plurality of second magnetic plates associating predetermined ones of said posts in information storage groups, each of said second posts having substantially rectangular hysteresis characteristics and being patterned to complete a plurality of legs including first, second, third and fourth legs having a single common intersection between the posts of each storage group, first and second of said legs having a minimum cross-sectional area no greater than twice that of said third leg, each of said first and second legs having a length less than said third leg, means for inducing an unblocked state in said third and fourth legs such that said first and second legs are unblocked to a switching flux, and read-out means for applying a switching pulse to said first and second legs.

15. A magnetic memory arrangement comprising a first magnetic plate having a plurality of posts protruding therefrom, a plurality of second magnetic plates associating predetermined ones of said posts in information storage groups, each of said second plates having substantially rectangular hysteresis characteristics and being patterned to complete a plurality of legs including first, second and additional legs having a single common intersection between the posts of each storage group, first and second of said legs having a minimum cross-sectional area no greater than twice that of the one of said additional legs having the smallest minimum cross-sectional area, said intersection having a minimum cross-sectional area greater than twice that of the one of said additional legs having the largest minimum cross-sectional area, each of said additional legs having a length greater than that of said first leg plus the width of said intersection, means for inducing an unblocked state in said additional legs such that said first and second legs are unblocked to a switching flux, read-out means for applying a switching pulse to said first and second legs, and means for detecting flux switching in said first and second legs.

16. A magnetic memory arrangement comprising a first magnetic plate having a plurality of posts protruding therefrom, a plurality of second magnetic plates associating predetermined ones of said posts in information storage groups, said second plates having substantially rectangular hysteresis characteristics and being patterned to complete between the posts of each storage group a plurality of legs having a single intersection, means for inducing blocked and unblocked states in selected ones of said legs such that a pair of said legs between two of said posts of each storage group is blocked or unblocked, respectively, to a switching flux, and means for applying a switching pulse to said pair of legs.

17. A magnetic memory arrangement in accordance with claim 16 also including means for detecting flux switching in said pair of legs.

18. A magnetic element comprising a first magnetic plate having six posts protruding therefrom, a second magnetic plate having substantially rectangular hysteresis characteristics overlying said posts, said second magnetic plate being patterned to provide six distinct legs having a common intersection, each of said legs terminating on a different one of said six posts.

19. A magnetic element comprising a first magnetic plate having six posts protruding therefrom, a second magnetic plate having substantially rectangular hysteresis characteristics overlying said posts, said second magnetic plate being patterned to provide six legs having a common intersection, each of said legs terminating on a different one of said six posts, first and second of said legs each having a minimum cross-sectional area no greater than twice that of the remaining one of said six legs having the smallest minimum cross-sectional area.

No references cited.

BERNARD KONICK, *Primary Examiner.*

R. MORGANSTERN, *Assistant Examiner.*